United States Patent [19]

Mintchev et al.

[11] Patent Number: 4,583,673
[45] Date of Patent: Apr. 22, 1986

[54] APPARATUS FOR SOLDERING THE WINDING TO THE COMMUTATOR OF AN ELECTRIC MACHINE

[75] Inventors: Pavel M. Mintchev; Mihail H. Angelov; Hristomir D. Hristov; Stoimen S. Balinov; Nikolay V. Yordanov, all of Sofia, Bulgaria

[73] Assignee: Institute po Metaloznanie i Technologia na Metalite, Sofia, Bulgaria

[21] Appl. No.: 679,883

[22] Filed: Dec. 10, 1984

[30] Foreign Application Priority Data

Dec. 9, 1983 [BG] Bulgaria .................................. 63386

[51] Int. Cl.⁴ .......................... B23K 1/08; B23K 3/06; B23K 35/14
[52] U.S. Cl. ...................................... 228/37; 228/56.1
[58] Field of Search ...................... 228/56.1, 33, 37, 39

[56] References Cited

U.S. PATENT DOCUMENTS

| | | | |
|---|---|---|---|
| 2,264,703 | 12/1941 | Lenz | 228/39 |
| 3,825,994 | 7/1974 | Coleman | 228/37 X |
| 4,331,279 | 5/1982 | Minchev et al. | 228/39 X |
| 4,375,270 | 3/1983 | Minchev et al. | 228/39 X |

FOREIGN PATENT DOCUMENTS 95568 12/1983 European Pat. Off. ............. 228/33

Primary Examiner—Nicholas P. Godici
Assistant Examiner—Carmine Cuda

[57] ABSTRACT

Apparatus for soldering the winding to the commutator of a rotor of great weight of an electric machine. The apparatus has a vessel containing a bath of molten solder and electric resistance heaters, a single-phase magneto-hydrodynamic pump consisting of a first magnetic core disposed beneath the vessel, the first magnetic core being supported from below and surrounded by a winding and solder stream-formation unit made of ferro magnetic material which is concentric with the first magnetic core. The bottom wall of the vessel is disposed on the first magnetic core, and within the vessel and on the bottom thereof there is fastened rigidly an additional, second hollow magnetic core, which is a continuation of the first magnetic core, while a tubular casing which is concentric with the second magnetic core, and which is of stepped shape, seats with its external step on the additional, second hollow magnetic core. The weight of a rotor placed in the upper end of the case of the tubular casing is transmitted to the second magnetic core from the tubular casing, through the bottom walls of the vessel, to the first magnetic core, and then to the external support for the first magnetic core.

4 Claims, 1 Drawing Figure

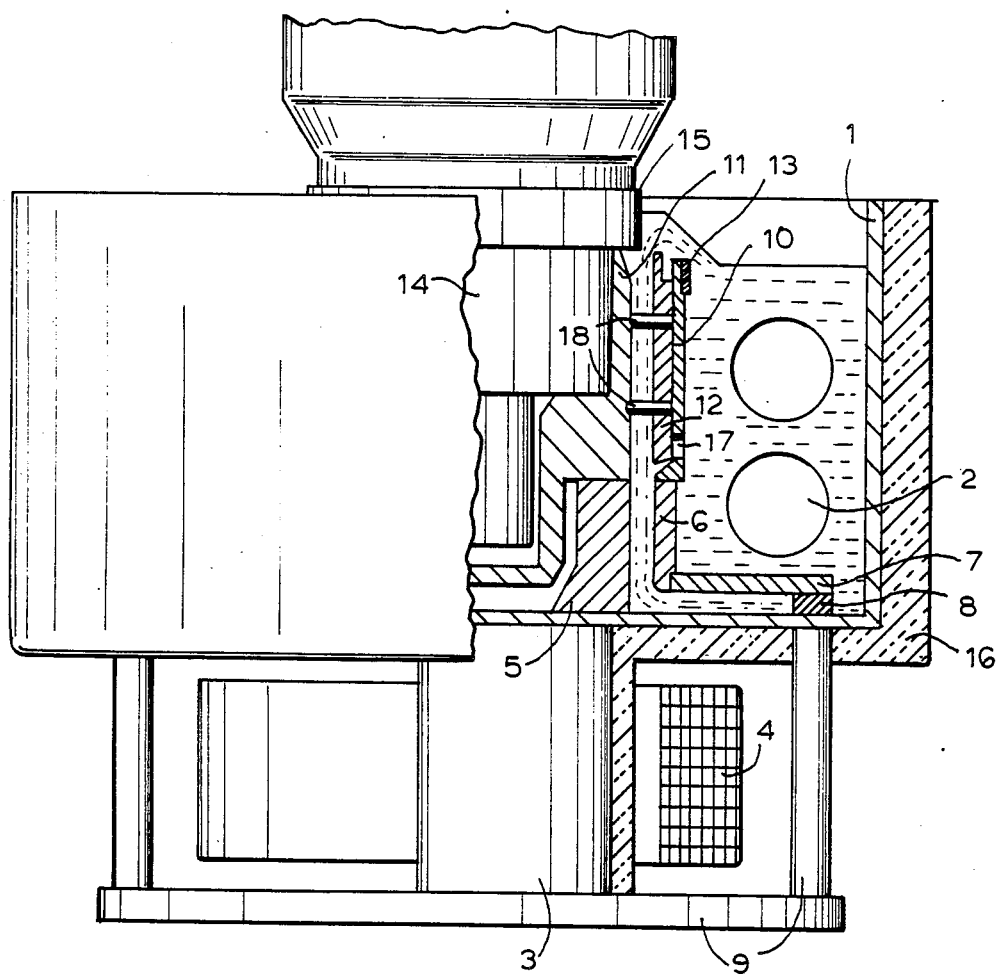

APPARATUS FOR SOLDERING THE WINDING TO THE COMMUTATOR OF AN ELECTRIC MACHINE

This invention relates to an apparatus for soldering the wires of the armature winding to the commutator of an electric machine with a rotor of great weight.

There is known an apparatus for soldering the winding to the commutator of an electric machine (Bulgarian Authors' Certificate No. 32, 241), which comprises a single-phase magneto-hydrodynamic pump, consisting of a magnetic core, surrounded by a winding, a solder stream-formation unit made of ferromagnetic material, a vessel with bath with molten solder and electric resistance heaters. The solder stream-formation unit is disposed underneath the vessel containing the solder bath and is connected to it via inlet conduits and one outlet conduit, communicating with a central hole in the bottom of the vessel. Above the central hole in the bottom of the vessel there is fastened a base or support which is a hollow cylinder with a conical internal bottom surface, and above the conical surface there are provided radial holes, while in the upper part of the support there are at least three vertical conduits and a limiting ring. Concentric with the support there is disposed a changeable nozzle unit, made up of a tubular casing with a chamfered upper end, which is rigidly fastened in a sleeve, the bottom surface of which is conical with the same inclination as that of the internal bottom surface of the hollow cylinder. Between the tubular casing and the sleeve there is formed an annular passage which defines the stream of the molten solder. This apparatus is versatile since it is possible to use it with commutators of different diameters.

A drawback of this apparatus lies in the limited permissible weight-bearing capability of the changeable nozzle unit and the bottom of the bath and, therefore, cannot be used in the case of rotors of great weight.

Another drawback is the increased thermal losses, resulting from the fact that the solder stream-formation unit is arranged outside the bath and is connected to it via external conduits having considerable heat-dissipating surfaces.

It is, therefore, a general object of this invention to provide an apparatus which makes it possible to solder the winding to the commutator of rotors of great weight, and which can operate with reduced thermal losses, while preserving its versatility.

This object is achieved by an apparatus for soldering the winding to the commutator of an electric machine, which comprises a vessel containing a bath of molten solder and electric resistance heaters, a single-phase magneto-hydrodynamic pump consisting of a first magnetic core, surrounded by a winding, and a solder stream-formation unit made of ferro-magnetic material which is concentric with the first magnetic core, a base member or support which is a hollow cylinder or sleeve with a conical internal bottom surface and radial holes arranged above the conical surface and a limiting ring, and a changeable nozzle unit disposed concentrically on the base and consisting of a tubular casing with a chamfered upper end, which is rigidly fastened in its sleeve.

The vessel containing the solder bath is disposed on the first magnetic core, and within the vessel and on the bottom thereof there is rigidly fastened an additional, hollow, second magnetic core, which is a continuation of the first magnetic core, while the tubular casing, which is of stepped shape, seats with its external step on the additional hollow second magnetic core. Concentrically with the additional hollow second magnetic core there is disposed a solder stream-formation unit which consists of a cylindrical part carrying the base with a limiting ring, and disc, which is rigidly affixed to the bottom of the vessel containing the solder bath by means of spacing inserts made of ferromagnetic material.

The advantages of the apparatus of the invention lie in the possibility of soldering windings to the commutator of rotors of great weight while preserving its versatility, and having reduced thermo losses and thus a reduced consumption of electric energy. This is achieved by placing the solder stream-formation unit in the bath, thus eliminating the need of external conduits.

For a better understanding of the invention, reference should be made to the accompanying drawing, in which:

The single FIGURE is a view partially in vertical cross-section and partially in elevation of a preferred embodiment of the apparatus with the parts thereof in the working position of the apparatus.

As shown in the drawing, a vessel 1, made of non-magnetic metal, contains a bath of molten solder and electric resistance heaters 2. A single-phase magneto-hydrodynamic pump, comprising a first, lower magnetic core 3 surrounded by a winding 4, is disposed underneath the vessel 1 in engagement with the bottom thereof, and an additional or second magnetic core 5 of annular shape, which is disposed within the vessel 1, rests on the bottom thereof in general alignment with the first magnetic core 3 beneath the bottom of the vessel. A solder stream-formation unit comprises a cylindrical part 6 disposed radially outwardly of and concentric with the second magnetic core 5, and a horizontally disposed disc 7 having its radially inner edge connected to the annular lower edge of the cylindrical part 6. Disc 7 is fixed to the bottom of the vessel 1, and is spaced from such bottom by one or more annular inserts 8 made of ferro-magnetic material which are disposed concentrically of the additional, second, hollow magnetic core 5. External magnetic cores 9 connect the disc 7 of the solder stream-formation unit 6, 7 to the first magnetic core 3.

To the upper end of cylindrical part 6 of the solder stream-formation unit 6, 7 there is fixed a base member 10 in the form of a first sleeve, in which there is disposed a changeable nozzle unit comprising a radially inner tubular casing 11 of stepped shape with a chamfered upper end and a radially outer, sleeve 12; casing 11 and the sleeve 12 are rigidly connected together by radially disposed rod-like members 18, as shown. In the bottom portion of the base member 10, there are a plurality of angularly spaced holes 17 (one shown) while in the upper portion there is fastened by an easily releasable joint, a limiting ring 13 which defines the upper limit of travel of the sleeve 12 and thus of the tubular casing 11 as well. When the apparatus supports a rotor of a rotating electrical machine, as shown, the commutator 14 of the rotor rests within the upper part of the tubular casing 11, and is supported by engagement of the lower end of the commutator upon the step of casing 11. Casing 11 in turn then rests upon the upper end of the second magnetic core 5, which is supported by externally supported magnetic core 3, acting through the bottom of vessel 1.

The operation of the apparatus of this invention is as follows:

The melting of the solder in the vessel 1 is effected by the electric resistance heaters 2 and by way of induction by single-phase magnetic hydrodynamic pump. After the melting of the solder, the hydrodynamic forces push the nozzle unit 11, 12 into its upper position, up to engagement of the upper end of the sleeve 12 with the limiting ring 13. The molten solder, sucked from the bottom of the solder bath in vessel 1, passes through the nozzle unit 11, 12 and back to the bath in the vessel 1 through the now open holes 17 in the bottom zone of the base or sleeve 10.

When a rotor is placed in the apparatus, the commutator 14 enters into the tubular casing 11 until it touches its internal step; it presses and moves the nozzle unit 11, 12 downwardly until the tubular casing 11 touches the additional hollow magnetic core 5, whereby the sleeve 12, which moves downwardly with casing 11, covers the holes 17 in the base or sleeve 10. Sealing between the commutator 14 and the tubular casing 11 is effected by a sealing ring 15, made of heat-resistant material, which is telescoped over the commutator 14, as shown. The molten solder pushed by the solder stream-formation unit now passes through the unit 11, 12, forms a ring-shaped stream, washes the tongues of the commutator 14, heats them, and solders the wires to the plates of the commutator 14.

When taking out the rotor, the solder stream-formation unit 11, 12 is moved upwardly until sleeve 12 touches the limiting ring 13. At that time, the molten solder again passes through the now open holes 17 in the base or sleeve 10.

In cases when it is necessary to solder a commutator with a diameter different from the previous one, the limiting ring 13 is removed and the nozzle or stream forming unit 11, 12 is replaced by a suitable one.

The weight of the rotor is taken-up by the tubular casing 14, the additional, hollow magnetic core 5, and the first magnetic core 3. For reducing thermal losses, vessel 1 and the magnetic core 3 are covered with thermal insulation 16.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. Apparatus for soldering the winding to the commutator of a rotor of an electric machine, comprising a vessel adapted to contain a bath of molten solder, electric resistance heaters in the vessel, a single-phase magneto-hydrodynamic pump having a first externally supported magnetic core surrounded by a winding disposed beneath the bottom wall of the vessel, a solder stream-formation unit made of ferro-magnetic material, which is concentric with the first magnetic core, the bottom wall of the vessel being diposed upon and supported by said first, externally supported magnetic core, within the vessel and on the bottom wall thereof there is rigidly fastened an additional, second, hollow magnetic core, which is a continuation of the first magnetic core, a tubular casing which is concentric with the second magnetic core, and which is of a stepped shape, seating with its external step on the additional, second, hollow magnetic core, the weight of a rotor placed in a seat in the upper end of the tubular casing being transmitted to the second magnetic core from the tubular casing, through the bottom wall of the vessel, to the first magnetic core, and then to the external support for the first magnetic core.

2. Apparatus according to claim 1, wherein the solder stream-formation unit is formed, on the one hand, by the external surface of the second magnetic core and the wall of the external surface of the tubular casing, and on the other hand by a first, radially inner sleeve disposed radially outwardly of the tubular casing and concentric therewith so as to form an annular solder conducting nozzle therebetween, the tubular casing and the first sleeve being formed of ferro-magnetic material.

3. Apparatus in accordance with claim 2, wherein the first sleeve accurately fits within a second outer sleeve, said outer sleeve being made of ferro-magnetic material, means connecting further, external magnetic cores, associated with the winding, to the lower end of the outer sleeve, there being a plurality of apertures in the outer sleeve in the lower part thereof, such apertures being closed by the inner sleeve when the inner sleeve and the tubular casing are thrust downwardly by the weight of a rotor disposed in the seat in the tubular casing, whereby the solder stream flowing upwardly through the solder stream-formation unit is confined to an annular path between inner surfaces provided by the second magnetic core and the tubular casing on the one hand and the first, radially inner sleeve which forms the outer boundary of the path of the solder through the stream-formation unit.

4. Apparatus according to claim 3, wherein the means magnetically connecting the external magnetic cores with the lower end of the outer, second sleeve comprises an annular radially inwardly extending disc made of ferro-magnetic material disposed coaxial of the first magnetic core and a magnetic sleeve, connected between the inner edge of the disc and the lower end of the second sleeve.

* * * * *